Figure 1:
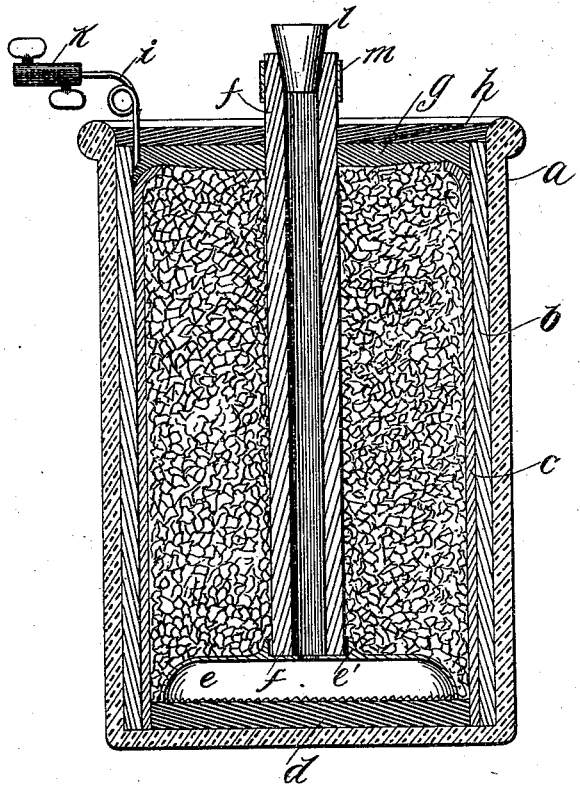

(No Model.)

J. T. TODD.
DRY BATTERY.

No. 548,730.  Patented Oct. 29, 1895.

Witnesses:
George L. Cragg.
W. Clyde Jones.

Inventor:
John T. Todd.
By Barton & Brown
Attorneys.

UNITED STATES PATENT OFFICE.

JOHN T. TODD, OF TUSCOLA, ILLINOIS.

DRY BATTERY.

SPECIFICATION forming part of Letters Patent No. 548,730, dated October 29, 1895.

Application filed February 6, 1895. Serial No. 537,511. (No model.)

*To all whom it may concern:*

Be it known that I, JOHN T. TODD, a citizen of the United States, residing at Tuscola, in the county of Douglas and State of Illinois, have invented a certain new and useful Improvement in Dry Batteries, (Case No. 1,) of which the following is a full, clear, concise, and exact description, reference being had to the accompanying drawings, forming a part of this specification.

My invention relates to that class of galvanic batteries generally designated as "dry batteries," in which the active material, usually in the form of a moistened powder, is sealed in a suitable vessel. The active material most generally consists of carbon dust and binoxide of manganese saturated with a solution of sal-ammoniac. Batteries of this class have been designed more particularly for open-circuit work—as, for example, for electric bells. It is especially desirable to provide for readily moistening the active material after the battery has run down.

My invention, speaking generally, consists in a cell in which the centrally-located carbon electrode, serving as a negative electrode, is made hollow, whereby liquid may be admitted to the interior of the cell, a stopper being provided for sealing the outer end of the hollow electrode.

In the bottom of the cell I place an inverted cup, thus forming a receptacle with which the hollow carbon electrode communicates, by means of an opening in inverted cup opposite the open end of the hollow carbon, the active material being adapted to rest upon the top of the cup, a receptacle being thus provided in the bottom of the cell for the retention of the liquid adapted to intermingle with the active material, the hollow carbon also acting as a fountain, feeding into the receptacle formed by the inverted cup.

In making the cell, when the active material is being packed down around the carbon electrode, the liquid, instead of rising to the top and preventing the formation of an efficient seal, as sometimes has happened heretofore, passes to the receptacle thus provided at the bottom of the cell, from which it may pass during the continued use of the cell into contact with the active material; also, when it is desired to moisten the active material after the battery has run down liquid may be poured through the hollow electrode into the receptacle at the bottom of the cell, the hollow carbon serving also as a fountain to feed the liquid, from which it may rise to permeate the active material. Surrounding the active material is provided a layer of pulp-board, which rests against the zinc or positive electrode, the layer of pulp-board thus serving to separate the zinc from the powdered active material and at the same time serving to retain moisture. In sealing the cell the upper edge of the pulp-board is turned inward and a layer of sealing-wax formed over the top of the active material and the overturned edge of the pulp-board the sealing-wax thus passing down between the zinc electrode and the pulp-board at the top and effectually sealing the contents of the zinc cylinder. A second layer of sealing-wax is then flowed over the top of the layer thus formed, this layer passing over the top of the zinc cylinder and adhering to the outer porcelain cup, thus completely sealing the cell. Outside of the zinc plate is provided a cup, of porcelain or other insulating material, which serves to protect the zinc plate and to prevent the escape of the active material from the cell or the admittance of air should the zinc plate be eaten away at any point.

I will describe my invention more particularly by reference to the accompanying drawings, in which—

Figure 2:
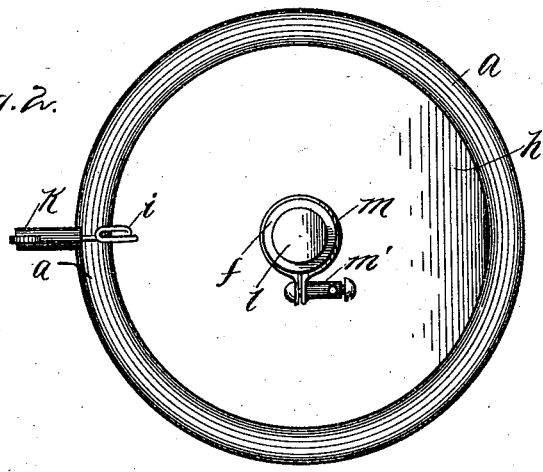
Figure 3:
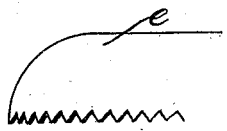

Figure 1 is a sectional view of a dry battery embodying my invention. Fig. 2 is a plan view thereof. Fig. 3 is a detail view of the inverted cup.

Like letters refer to like parts throughout the several figures.

The cup or receptacle $a$ may be made of porcelain or other insulating material and incloses the zinc or positive electrode $b$, which is in the form of a plate bent into the form of a hollow cylinder and adapted to fit around the interior of the cup $a$. Against the interior surface of the zinc electrode rests a layer of pulp-board $c$, the pulp-board and the zinc plate both resting upon the bottom of the cup $a$. Over the bottom of the cup $a$ is poured a layer of pitch $d$, which serves to prevent the active material from coming in contact with the lower end of the zinc plate by passing beneath the pulp-board c. Upon the surface of the layer of pitch d rests an inverted cup e, a flange e' being provided on the upper surface of the said cup, in which the end of the hollow carbon or negative electrode f is adapted to rest, a hole being provided in the cup e registering with the bore of the electrode f. The active material, which may comprise carbon-dust and binoxide of manganese intermixed, is packed between the electrode f and the pulp-board c resting upon the top of the cup e.

In constructing the cell the mixture of carbon-dust and manganese is saturated with a solution of sal-ammoniac, sal-ammoniac solution is poured into the cell, and the pulp-board inside of the zinc cylinder having absorbed all the sal-ammoniac solution that it will hold the surplus is poured out just previous to filling the cell with the moistened active material. After the active material has thus been packed in position the upper edge of the pulp-board c is turned over, as illustrated, and a layer of wax g flowed upon the top of the cell, the wax thus passing down between the zinc plate b and the pulp-board c, thus effectually sealing the active material. The zinc plate does not extend to the top of the cup a, so that a second layer h of sealing-wax, flowed over the top of the first layer g and flush with the upper edge of the cup a, covers the zinc plate. A conducting-wire i, electrically connected with the zinc plate b, extends through the layers of sealing-wax g and h and is provided upon its end with a connecting-post k.

A cork or stopper l is adapted to be fitted into the outer end of the hollow carbon f to seal the same. This may be effected by first dipping the cork into sealing-wax, after which, while the sealing-wax is still hot, the cork may be pressed into position, thus firmly sealing the end of the hollow carbon. By first coating that portion of the surface of the carbon f and of the cup a with which the sealing-wax comes in contact with asphaltum varnish the sealing-wax is caused to adhere with greater tenacity.

To prevent the passage of the sal-ammoniac through the cup a, the cup, if porcelain, may be glazed. I have also given the cup a coat of asphaltum varnish on the inside.

The edge of the cup e, resting upon the surface of the layer of pitch d, is roughened or otherwise provided with apertures, so that the liquid may pass from the interior of the cup to the active material. When the cell is being formed and the moistened carbon-dust and manganese are being compressed and packed in the cell, the liquid, instead of rising to the top and resting upon the surface of the active material to prevent the formation of an efficient seal, passes downward to the receptacle provided beneath the cup e, from which, during the continued use of the cell, it passes upward to moisten the active material. When the cell from long use has run down, the stopper l may be removed and the solution of sal-ammoniac poured through the opening into the hollow carbon and the receptacle beneath the cup e, from which it may pass to the active material.

Around the carbon electrode f is clamped a collar m, which carries a binding-post m'.

Having thus described my invention, what I claim as new, and desire to secure by Letters Patent, is—

1. In a dry battery, the combination with a containing vessel, of a zinc plate serving as the positive electrode and resting against the inner walls of said retaining vessel, a cup or wall provided at the bottom of said vessel to form a receptacle, a hollow carbon electrode communicating with said receptacle and extending from the same to the top of said vessel, solid active material packed within said vessel above said receptacle and surrounding said carbon electrode, said active material being in communication with said receptacle, sealing material adapted to seal the top of said vessel, and a removable stopper adapted to be sealed into the end of said hollow electrode; whereby moistening material may be introduced into the cell through said hollow electrode; substantially as described.

2. In a dry battery, the combination with the vessel a, of the zinc or positive electrode b placed around the interior of said vessel, a layer of pulp board c resting against the interior of said electrode b, an inverted cup e, situated in the bottom of the vessel to form a receptacle, the hollow carbon electrode f, the interior thereof communicating with said receptacle, the active material resting upon said cup e and being packed about electrode f, a layer of sealing compound g resting upon the top of the active material and the inturned upper edge of the layer of pulp board c, and a second layer of sealing compound h resting upon said layer g, substantially as described.

In witness whereof I hereunto subscribe my name this 30th day of January, A. D. 1895.

JOHN T. TODD.

Witnesses:
J. W. HAMILTON,
C. YELTON.